United States Patent [19]
Romero

[11] Patent Number: 6,009,158
[45] Date of Patent: Dec. 28, 1999

[54] CALLER ID CALL-BACK DEVICE

[75] Inventor: Stanley A. Romero, Birmingham, Ala.

[73] Assignee: BellSouth Intellectual Property Corporation, Wilmington, Del.

[21] Appl. No.: 08/906,014

[22] Filed: Aug. 4, 1997

[51] Int. Cl.[6] .............................. H04M 3/42; H04M 1/57; H04M 15/06; H04M 1/00

[52] U.S. Cl. .......................... 379/209; 379/142; 379/216; 379/356

[58] Field of Search ..................................... 379/209, 216, 379/355, 142, 127, 356

[56] References Cited

U.S. PATENT DOCUMENTS

| | | | |
|---|---|---|---|
| 4,924,496 | 5/1990 | Figa et al. | 379/142 |
| 5,592,538 | 1/1997 | Kosowsky et al. | 379/355 X |
| 5,883,942 | 3/1999 | Lim et al. | 379/142 |

*Primary Examiner*—Harry S. Hong
*Attorney, Agent, or Firm*—Jones & Askew, LLP

[57] ABSTRACT

A caller ID call-back device that allows a user to automatically place telephone calls to selected directory numbers using several dialing plans. A user may select a dialing plan by selecting a first, second, or third dialing plan selection device. Selection of each dialing plan selection device causes the caller ID call-back device to automatically dial a received caller ID directory number using a particular dialing plan. The dialing plans typically include the last seven digits of the received directory number, all ten digits of the received directory number, and one plus all ten digits of the received directory number. The caller ID call-back device may also include a memory call-back selection device for automatically dialing a received caller ID directory number in accordance with a dialing plan indicator that was previously saved in association with the directory number. After the user selects a dialing plan to automatically place a telephone call to a received caller ID directory number, the caller ID call-back device may prompt the user the save the selected dialing plan in association with the received directory number. The user may also save other dialing plans in association with a stored directory number, such as an account code or a calling card code, which the caller ID call-back device automatically dials before dialing the associated directory number.

13 Claims, 7 Drawing Sheets

CALLER ID CALL-BACK DEVICE

TECHNICAL FIELD

The present invention relates generally to telecommunications systems and, more particularly, relates to an improved caller ID call-back device that allows a user to automatically place telephone calls to received caller ID directory numbers using several dialing plans.

BACKGROUND OF THE INVENTION

The North America Numbering Plan (NANP) specifies a 10-digit format for directory numbers, which are more commonly referred to as telephone numbers. The NANP is an integrated plan for assigning directory numbers throughout the United States (including Puerto Rico and the U.S. Virgin Islands), Canada, Bermuda, Anguilla, Antigua, Bahamas, Barbados, British Virgin Islands, Cayamn Islands, Dominica, Dominican Republic, Grenada, Jamacia, Monteserrat, St. Kitts & Nevis, St. Lucia, St. Vincent, Turks & Cicos Islands, and Trinidad & Tobago.

A directory number is typically designated as NPA-NXX-XXXX, where the first three digits are the Numbering Plan Area (NPA) code, which is more commonly referred to as the area code. The next seven digits, designated as NXX-XXXX, are a terminating destination code. The first three digits of the terminating destination code, designated as NXX, are the central office code, also called the prefix or exchange. The last four digits of the terminating destination code, designated as XXXX, are a line, station, or subscriber code. The digits designated as "N" may be any number 2 through 9 and the digits designated as "X" may be any number 0 through 9.

In the NANP as originally implemented, area codes were limited to the format N0/1X. That is, the first digit of the area code could be any number 2 through 9, the second digit of the area code could be either a 1 or a 0, and the third digit of the area code could be any number 0 through 9. This N0/1X format, which provided for a maximum of 160 area codes, was changed as of Jan. 1, 1995 due to a projected shortage of area codes. The new area code format, NXX, allows the second digit of the area code to be any number 0 through 9. The new area code format increased the number of permissible area codes by 640, to a total of 800 available area codes. For more information relating to the NANP, see the 1996 annual status report to the industry on Numbering Plan Area (NPA) codes, published on Jan. 30, 1996 as Bellcore Letter IL-96/01-016, which is incorporated by reference.

This increase in the number of available area codes has allowed many geographic areas to add new area codes in anticipation of increased directory number requirements. Although some subscribers may find the assignment of new area codes to be somewhat inconvenient, the administrators of the NANP have no choice but to add a new area code when nearly all of the directory numbers available under an existing area code have been assigned. Moreover, adding area codes provides local telephone service providers with additional flexibility for implementing billing and dialing plan alternatives for their subscribers. The number of area codes in use in North America, therefore, will likely continue to increase for the foreseeable future.

A distinction should be understood between the numbering plan, which is described above, and what is referred to as a dialing plan. The number plan, which refers to the assignment of directory numbers, is consistent throughout the NANP area and conforms to international numbering standards. A dialing plan, on the other hand, refers to the sequence of digits that a user must dial to place a telephone call from a particular originating station. For many years, only two dialing plans were required in the NANP: a non-toll or local telephone call (i.e., a telephone call to a directory number within the originating station's home area code) was placed by dialing the desired 7-digit terminating destination code; and an "InterLata" long distance or toll telephone call was placed using an 11-digit dialing plan (i.e., by dialing the digit one plus the desired 10-digit directory number). But in recent years, a third, 10-digit dialing plan has been adopted in many locations. This 10-digit dialing plan may not applied consistently across the NANP area and, therefore, can cause confusion in the telephone-using population.

The use of 10-digit dialing plans are not consistent across the NANP area because state or other local regulatory agencies generally determine dialing plans at the local level. As a result, demographic anomalies are often reflected in dialing plans that vary somewhat from location to location. In particular, localities that are close to or straddle area code boundaries may mandate 7-digit dialing zones that encompass portions of two or more area codes. This occurs frequently because area code boundaries often follow state or other political boundaries whereas communities often develop at the confluence of several political subdivisions.

For these multi-area-code communities, regulators may require a 7-digit dialing zone that includes parts of several area codes. Local regulatory requirements may also produce a dialing plan that includes a 7-digit dialing zone and a 10-digit dialing zone within the same area code. In this situation, therefore, a dialed area code is not always sufficient to determine the appropriate dialing plan. Rather, subscribers must learn or look-up the dialing plan on a per-directory-number basis.

Furthermore, area codes are often assigned by splitting a region into two area codes that serve two distinct, usually adjacent, geographic regions.

Alternatively, a new area code may be assigned by overlaying a new area code over an existing area code in the same geographic region. When this happens, a large number of terminating destinations that were formerly in a subscriber's home area code may suddenly become part of a foreign area code. Although the local telephone service provider typically allows non-toll telephone calls between these two area codes, across-area-code telephone calls typically require a 10-digit dialing plan, whereas within-area-code telephone calls typically require a 7-digit dialing plan.

For example, the 404 area code for the Atlanta, Ga. region was recently divided into a 404 area code and a 770 area code. As a result, a 7-digit dialing plan may be used to place a telephone call from a 404 directory number to a 404 directory number, whereas a 10-digit or 11-digit dialing plan must be used to place a telephone call from a 404 directory number to a 770 directory number. An InterLata telephone call from either the 404 area code or the 770 area code requires an 11-digit dialing plan including the digit one plus the desired 10-digit directory number. It should be noted that a toll telephone call may be InterLata or IntraLata. For instance, an IntraLata telephone call from the 404 area code to the 770 area code could be a non-toll (i.e., 10-digit) or a toll (i.e., 11-digit) telephone call depending on the distance between the originating and terminating stations.

Generally stated, the continuing increase in the number of area codes will likely be accompanied by a continuing increase in new 10-digit dialing plans. As a result, a significant number of long-time telephone service subscribers, many of whom are used to using only two dialing plans, will have to learn to use a third, 10-digit dialing plan for the first time. This will lead to increased levels of confusion in the telephone-using population and a corresponding increase in the number of dialing-plan-related service calls that must be handled by local telephone service providers.

To make matters worse, many telephone users have come to rely on caller ID call-back devices to place telephone calls to received directory numbers. These devices typically receive the full 10-digit originating directory number, without any preceding dialed digits, regardless of the dialing plan used to place the in-coming telephone call. Therefore, a caller ID call-back device must be configured to dial the correct dialing plan to place an out-going telephone call to the received caller ID directory number. This typically requires the device to be programmed to accommodate the various dialing plans for a particular location. But pre-programming each caller ID call-back device to accommodate a particular set of dialing plans is complicated by the fact that dialing plans depend on the location of use and can change in an unpredictable manner. Therefore, some prior art caller ID call-back devices are user-programmable.

For example, caller ID call-back devices having two dialing plan selection devices—one for a local (e.g., 7-digit or 10-digit dialing plan) and a second for a long distance (e.g., 11-digit dialing plan)—have been in use for a number of years. These devices may typically be programmed with area codes that require a 7-digit dialing plan and/or a 10-digit dialing plan for local calls, in order to accommodate 7-digit, 10-digit, and 11-digit dialing plans using only two dialing plan selection devices. This allows these devices to be programmed to operate properly in many locations. But because these devices rely on area codes to determine dialing plans, they cannot be programmed to operate properly for all directory numbers in locations in which more than one dialing plan is required to place telephone calls to directory numbers within the same area code.

Moreover, some users will inevitably fail to program their caller ID call-back devices properly. For example, a user may purchase a caller ID call-back device and initially program the device to operate in a particular location. The user may later move the caller ID call-back device to a new location. In many cases, the caller ID call-back device must be reprogrammed to operate properly in the new location. If the user has lost or discarded the instruction manual, the user may have to place a service call to the local telephone service provider or the manufacturer of the caller ID call-back device to determine how to reprogram the device. Therefore, disseminating a large number of caller ID call-back devices with two dialing plan selection devices can be expected to cause a significant number of service calls.

There is, therefore, a need for a caller ID call-back device that is intuitively easy to understand. There is a further need for a caller ID call-back device that does not have to be programmed to properly dial selected directory numbers using three different dialing plans.

SUMMARY OF THE INVENTION

The invention meets these needs by providing a caller ID call-back device that allows a user to automatically call back caller ID directory numbers using a first, second, or third dialing plan selection device. Selection of each dialing plan selection device causes the caller ID call-back device to automatically dial a received caller ID directory number using a particular dialing plan. The first dialing plan typically includes the last seven digits of the received directory number, the second dialing plan typically includes all ten digits of the received directory number, and the third dialing plan typically includes one plus all ten digits of the received directory number.

The caller ID call-back device may also include a memory call-back selection device for automatically dialing a received caller ID directory number in accordance with a dialing plan indicator that was previously saved in association with the directory number. After the user selects a dialing plan to automatically place a telephone call to a received caller ID directory number, the caller ID call-back device may prompt the user the save the selected dialing plan in association with the received directory number. The user may also save other dialing plans in association with a stored directory number, such as an account code or a calling card code, which the caller ID call-back device automatically dials before dialing the associated directory number.

Generally described, the invention is a caller ID call-back device for automatically placing a telephone call to a directory number using a selected dialing plan. The caller ID call-back device includes a controller and a caller ID circuit for detecting the originating directory number of a received telephone call. The device also includes a display device coupled to the controller for displaying the received directory number, and a dialing circuit coupled to the controller for automatically placing a telephone call to a directory number using a first, second, or a third dialing plan.

The controller is configured for receiving user input from the first, second, or third dialing plan selection devices. In response to receiving the user input from one of the dialing plan selection devices, the dialing circuit automatically places a telephone call to the received directory number using an associated dialing plan. For example, the first dialing plan selection device causes the caller ID call-back device to automatically dial a selected directory number using the first dialing plan, such as the last seven digits of the directory number. The second dialing plan selection device causes the caller ID call-back device to automatically dial the selected directory number using the second dialing plan, such as all ten digits of the directory number. And the third dialing plan selection device causes the caller ID call-back device to automatically dial a selected directory number using the third dialing plan, such as one plus all ten digits of the directory number.

It is, therefore, an object of the invention to provide a caller ID call-back device that is intuitively easy to understand. It is a further object of the invention to provide a caller ID call-back device that does not have to programmed to properly dial selected directory numbers using three different dialing plans. That the present invention improves over the drawbacks of the prior art and accomplishes the objects of the invention will become apparent from the following detailed description of the preferred embodiments.

DETAILED DESCRIPTION OF THE PREFERRED EMBODIMENTS

Figure 1A:
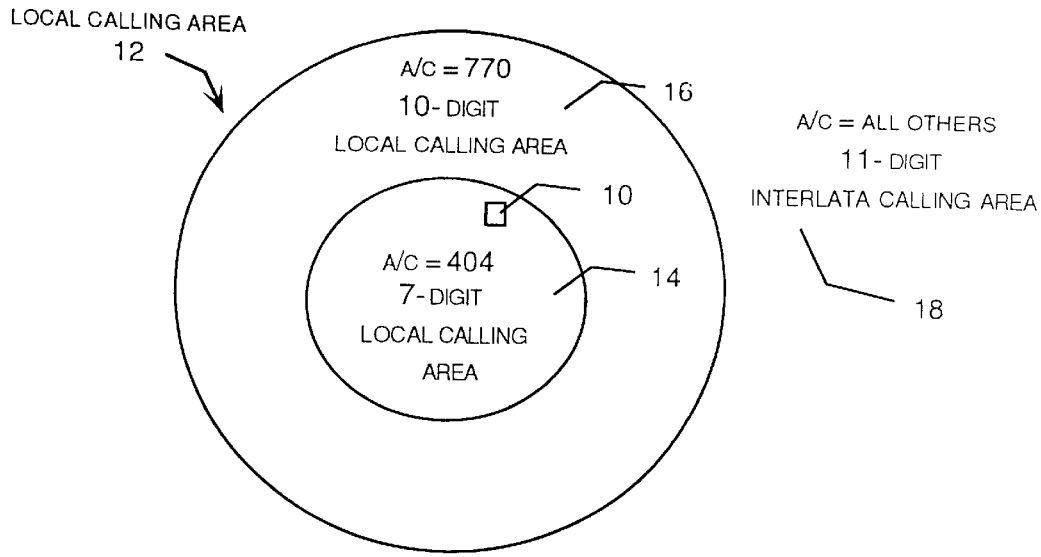
FIG. 1A is a diagram illustrating a first set of dialing plans.

Referring now to the drawings, in which like numerals indicate like elements throughout the several figures, the preferred embodiments of the present invention are described below with reference to the appended drawings. FIG. 1A is a diagram of a portion of the public switched telephone network (PSTN) illustrating a first set of dialing plans that might occur within a portion of the North American Numbering Plan (NANP) area. This portion of the PSTN is preferably operated as an Advanced Intelligent Network (AIN) of a typical local exchange carrier, which is well known to those skilled in the art. The AIN is operable for providing a service known as "caller ID" for identifying the originating directory number of a telephone call, which is also well known to those skilled in the art. A typical AIN is described in the commonly-owned patent to Weisser, Jr., U.S. Pat. No. 5,438,568, which is incorporated herein by reference.

FIG. 1A illustrates a first set of dialing plans for subscriber equipment 10 that may occur within the NANP. The subscriber's dialing area is divided into a local calling area 12 and an InterLata or toll calling area 18. The local calling area 12 includes a 404 area code 14 and a 770 area code 16. The InterLata calling area 18 includes all other area codes.

For the subscriber equipment 10, which is located within the 404 area code, a 7-digit dialing plan (i.e., the terminating destination code) may be used to place a telephone call within the 404 area code 14. A telephone call to the 770 area code 16, on the other hand, requires a 10-digit dialing plan (i.e., the destination area code plus the terminating destination code). And a telephone call to the InterLata calling area 18 requires an 11-digit dialing plan (i.e., one plus the destination area code and the terminating destination code). Thus, the subscriber equipment 10 may use at least three dialing plans to place telephone calls: (1) 7-digits; (2) 10-digits; and (3) 1+10-digits. It should be understood that for the dialing plans illustrated in FIG. 1A, the destination area code is sufficient to determine the required dialing plan. The destination area code is also sufficient to determine whether a telephone call to a selected directory number is a local or an InterLata telephone call.

Figure 1B:
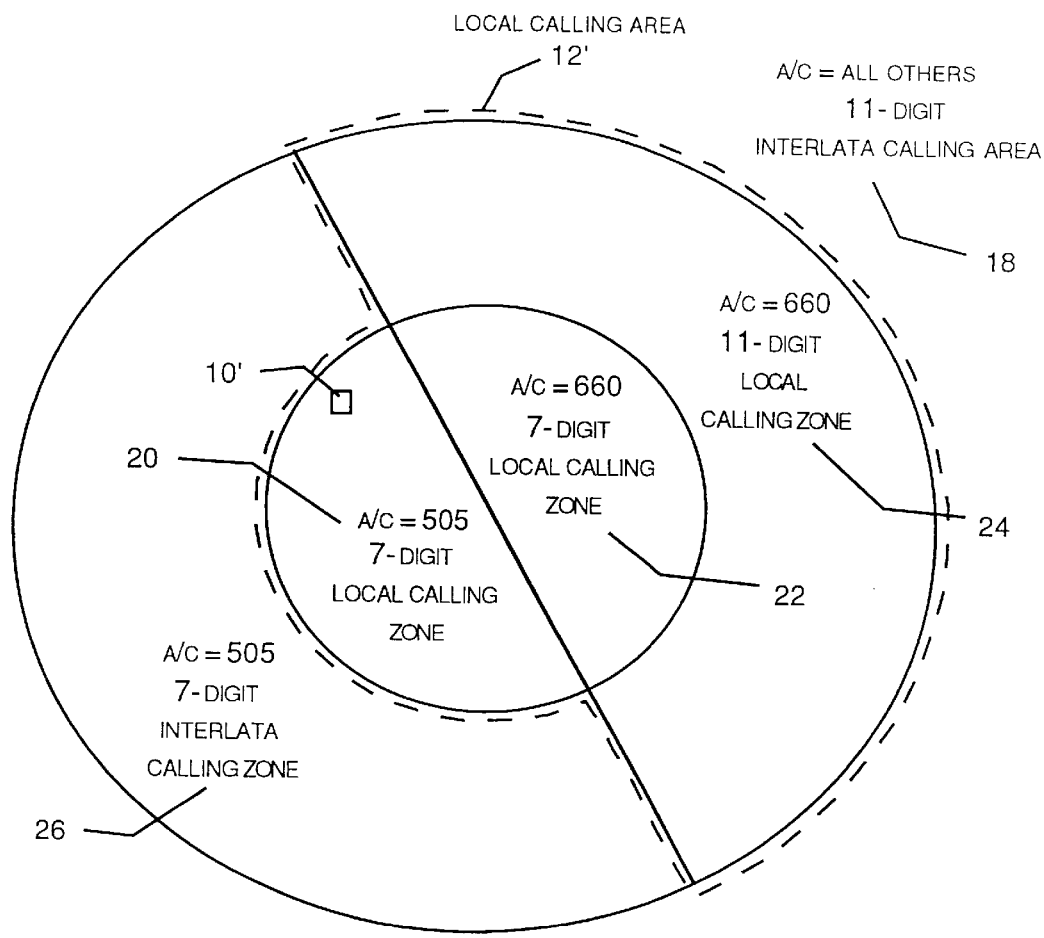
FIG. 1B is a diagram illustrating a second set of dialing plans.

FIG. 1B illustrates a second set of dialing plans that also may occur within the NANP. The dialing area for the subscriber equipment 10' is divided into a local calling area 12' and an InterLata or toll calling area 18. The local calling area 12' includes a 7-digit local calling zone 20 within a 505 area code and a 660 area code that is divided into a 7-digit local calling zone 22 and an 11-digit local calling zone 24. The InterLata calling area 18 includes the area codes other than the 505 and 660 area codes as well as an InterLata zone 26 within the 505 area code.

For the subscriber 10', who is located within the 7-digit local calling zone 20 of the 505 area code, a 7-digit dialing plan must be used to place a telephone call within the 7-digit local calling zones 20 and 22, which include portions of the 505 and 660 area codes. A local telephone call within the 11-digit local calling zone 24 of the 660 area code, on the other hand, requires an 11-digit dialing plan. And a telephone call to the InterLata calling area 18 also requires an 11-digit dialing plan. Thus, the subscriber equipment 10' uses only two dialing plans: (1) 7-digits; and (2)1+10-digits. But in this case, the destination area code not sufficient to determine the required dialing plan (i.e., some telephone calls to the 660 area code require the 7-digit dialing plan and others require the 11-digit dialing plan) or whether the telephone call will be local or InterLata (i.e., some 7-digit telephone calls to the 505 area code are local and others are InterLata).

Accordingly, a significant amount of flexibility should be built into a caller ID call-back device in order for the device to operate properly for both the FIG. 1A dialing plans and for the FIG. 1B dialing plans. In particular, the device should be capable of dialing all three dialing plans (i.e., 7-digits;10digits; and1+10-digits) without confusing local and InterLata telephone calls. This type of confusion might occur for the FIG. 1B dialing plans if a dialing plan selection device (e.g., a button) for the 7-digit dialing plan was labeled "local" because some 7-digit telephone calls to the 505 area code are local while others are InterLata. Similarly, confusion might occur under for the FIG. 1B dialing plans if a dialing plan selection device for the 11-digit dialing plan was labeled "long distance" because 11-digit telephone calls to the 660 area code are local while11-digit telephone calls to other area codes are InterLata.

The FIG. 1B dialing plans present the designers of caller ID call-back devices with a challenge because, unlike the FIG. 1A dialing plans, the destination area code of a selected directory number is not sufficient to determine the required dialing plan. This is because some telephone calls to the 660 area code require the 7-digit dialing plan while others require the 11-digit dialing plan. For this reason, a caller ID call-back device cannot determine the correct dialing plan simply from the 660 area code of a received directory number. Rather, the dialing plan for telephone calls to the 660 area code must be selected on a per-directory-number basis. Thus, a conventional two-button caller ID call-back device, which cannot be programmed to select dialing plans on a per-directory-number basis, cannot be programmed to properly call-back telephone calls to the 660 area code.

Figure 2:
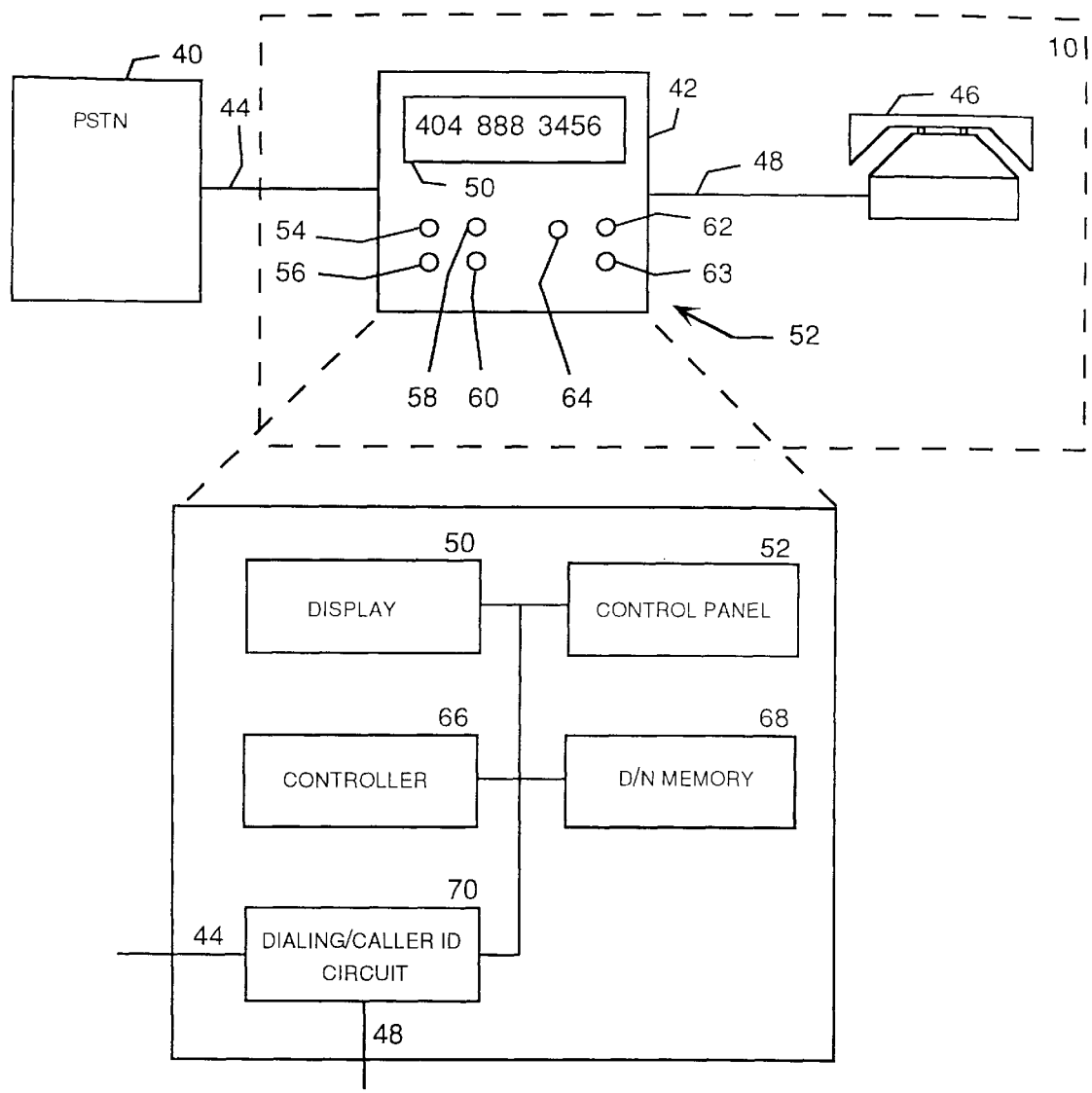
FIG. 2 is a block diagram of a caller ID call-back device with three dialing plan selection devices.

FIG. 2 is a block diagram of a caller ID call-back device 42 that provides the subscriber equipment 10 with a caller ID call-back capability. The caller ID call-back device 42 need not be programmed to operate properly, and it can be used to select dialing plans on a per-directory-number basis. The caller ID call-back device 42 is connected to the PSTN 40 by way of a telephone line 44, and to a telephone 46 by way of a telephone line 48, so that the device 42 is connected in series between the PSTN 40 and the telephone 46.

The caller ID call-back device 42 includes a display device 50, such as an LED, LCD, or other suitable electronic display. The display device 50 typically displays a 10-digit directory number, which may be the caller ID directory number of the most recent telephone call received by the caller ID call-back device 42. In this case, the displayed directory number was detected from the caller ID signal associated with the received telephone call. Alternatively, the displayed directory number may be a previously stored directory selected from a director number memory, as described below.

The caller ID call-back device 42 also includes a control panel 52 for receiving user input. The control panel 52 includes a number of input selection devices, such as the buttons 54, 56, 58, 60, 62, 63, and 64. The buttons 54, 56, 58, and 60 represent the buttons included on a conventional caller ID device. The caller ID call-back device 42 also includes a controller 66 for controlling the operation of the device in accordance with programmed instructions, a directory number memory 68 for storing a plurality (typically at about 25) of 10-digit directory numbers, and a dialing/caller ID circuit 70 for detecting a caller ID signal and automatically placing a telephone call in accordance with instructions from the controller 66. Each of these elements of the caller ID call-back device 42 may be manufactured from any of a variety of conventional components, as is known to those skilled in the art.

Generally, one of the buttons 54, 56, 58, and 60 allows a user to select a directory number for display in the display device 50, typically by scrolling through a list of directory numbers stored within the directory number memory 68. Another of these buttons allows a user the edit a selected directory number, another button allows a user to delete a selected directory number, and another button allows the user save a selected directory number. These buttons may also be used to implement many other functions, such as enabling call blocking, call forwarding, conference calling, and other features of the caller ID call-back device 42. The functions associated with the buttons 54, 56, 58, and 60 are known to those skilled in the art and, therefore, will not be described further.

The dialing plan selection devices 62, 63, and 64 allow the user to easily select among three dialing plans for automatically dialing a selected directory number that is displayed in the display device 50. Typically, the first button 62 is labeled "7-digit," the second button 63 is labeled "10-digit," and the third button 64 is labeled "1+." To automatically dial a directory number using a desired dialing plan, a user simply selects the button corresponding to the desired dialing plan. Thus, the user need not program the caller ID call-back device 42 in order for the device to operate properly. The user may therefore move the caller ID call-back device 42 from one location to another without having to reprogram the device. In addition, having three dialing plan selection devices, rather that two as in prior art caller ID call-back devices, provides a mechanism for selecting dialing plans on a per-directory-number basis.

The dialing plan selection devices 62, 63, and 64 are preferably buttons but may equivalently include a keyboard, a touch-sensitive screen, a voice recognition device, or other suitable input selection device. In addition, FIG. 2, as well as FIG. 4 described below, illustrate a conventional land-line telecommunications system. For simplicity, the disclosed embodiments of the present invention are described in the context of this conventional land-line telecommunications system. It should be understood, however, that alternative embodiments of the present invention may operate in association with cellular or other wireless telecommunications systems.

Figure 4:
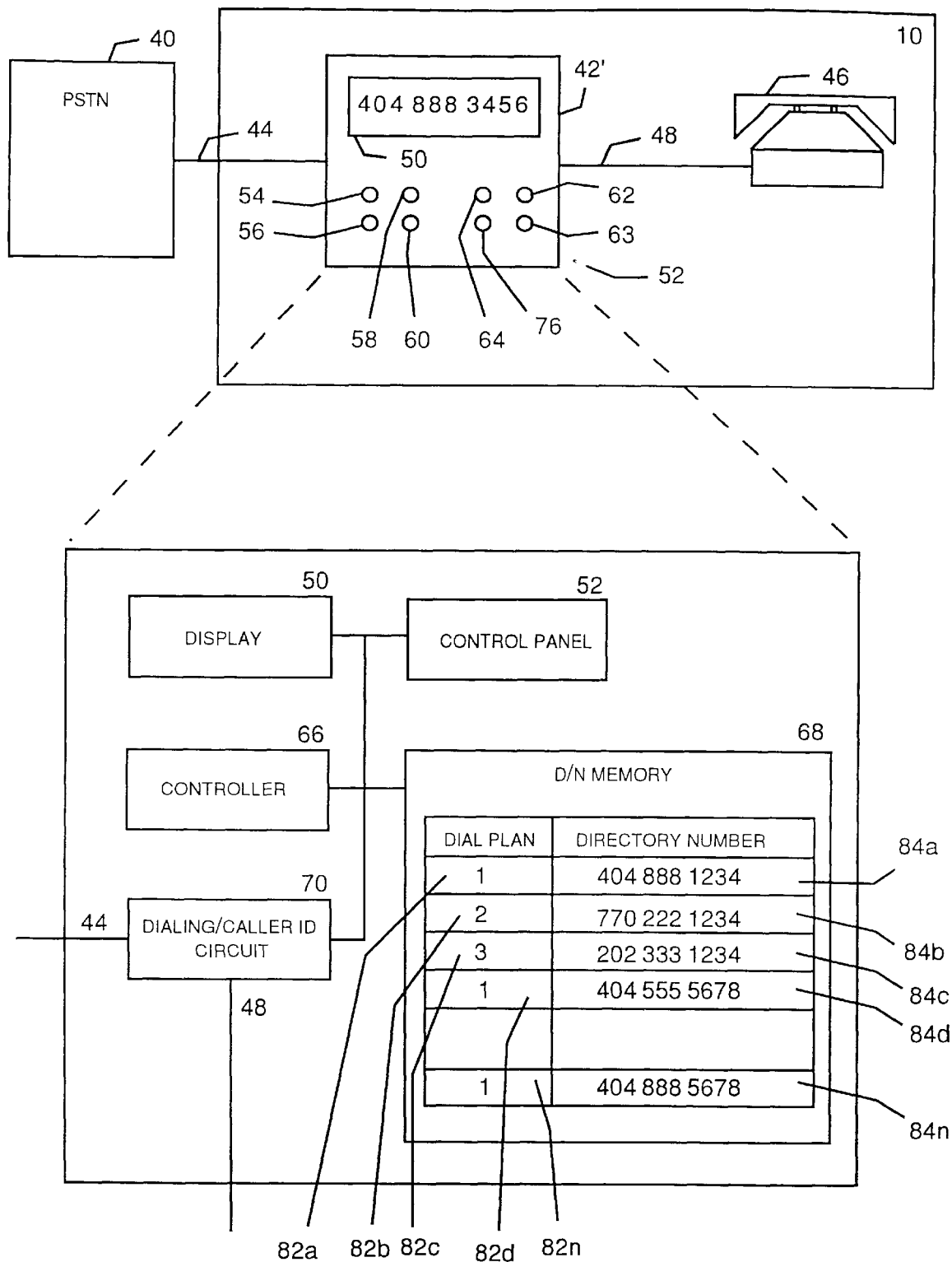
FIG. 4 is a block diagram of a caller ID call-back device with four dialing plan selection devices, one of which is a memory call-back selection device.

Furthermore, the caller ID call-back device 42, as well as the caller ID call-back device 42' shown in FIG. 4, are shown as a separate device connected in series between the PSTN 40 and the telephone 46. It should also be understood that an caller ID call-back device according to the present invention could be deployed in any type of device that is part of or the telephone 46 or connected in series between the PSTN 40 and the telephone 46. For example, an caller ID call-back device could be deployed within the telephone 46, a caller ID device, an answering machine, a facsimile machine, a computer, a communications panel in a home, a dashboard or console in an automobile, a marine radio in a boat, or any other device that may include a communication link with a land-line or wireless telecommunications system.

Figure 3:
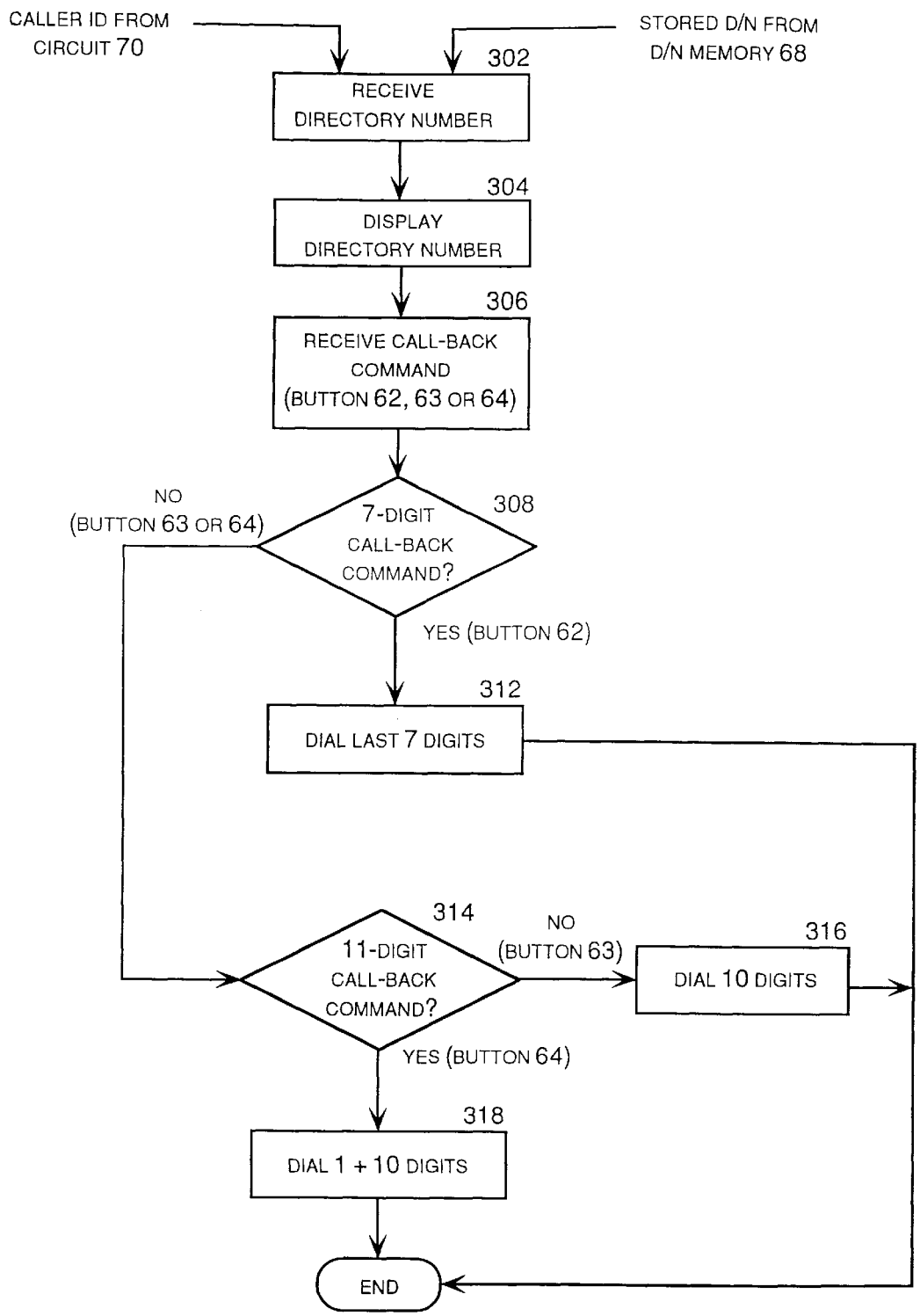
FIG. 3 is a logic flow diagram that illustrates the operation of the caller ID call-back device of FIG. 2.

FIG. 3 is a logic flow diagram that illustrates the operation of the caller ID call-back device 42 shown in FIG. 2. In step 302, the caller ID call-back device 42 receives a selected 10-digit directory number, either from the dialing/caller ID circuit 70 or from the directory number memory 68. In step 304, the selected 10-digit directory number is displayed in the display device 50. In step 306, the caller ID call-back device 42 receives a call-back command, either from the button 62, the button 63, or the button 64. In decision step 308, the caller ID call-back device determines whether the call-back command is a 7-digit call-back command from the button 62. If the call-back back command is a 7-digit call-back command from the button 62, the "YES" branch is followed from step 308 to step 312, in which the caller ID call-back device 42 places a telephone call to the selected directory number by dialing the last seven digits of the selected directory number. Step 312 is followed by the "END" step.

If the call-back command is not a 7-digit call-back command from the button 62, the "NO" branch is followed from step 308 to step 314, in which the caller ID call-back device 42 determines whether the call-back command is a 10-digit call-back command from the button 63 or an 11-digit call-back command from the button 64. If the call-back command is a 10-digit call-back command from the button 63, the "NO" branch is followed from step 314 to step 316, in which the caller ID call-back device 42 places a telephone call to the selected directory number by dialing all ten digits of the selected directory number. Step 316 is followed by the "END" step.

If the call-back command is an 11-digit call-back command from the button 64, the "YES" branch is followed from step 314 to step 318, in which the caller ID call-back device 42 places a telephone call to the selected directory number by dialing the digit one plus all ten digits of the selected directory number. Step 318 is followed by the "END" step. It should be understood that the decision steps 308 and 314 could be implemented by using the button 62 to latch a first line of the controller 66, by using the button 63 to latch a second line of the controller, and by using the button 64 to latch a third line of the controller.

Although the caller ID call-back device 42 works properly for all three dialing plans without having to program the device, a user may still find the device difficult to use in certain situations. In particular, a user must know, that is remember, which dialing plan to use for a particular selected directory number. Although some users may know the correct dialing plan for certain directory numbers stored in the directory number memory 68, other users may not be familiar with the dialing plan for all of these directory numbers. For example, a baby-sitter may not know the correct dialing plan for a caller ID directory number received by the caller ID call-back device 42. Similarly, a wife may not know the dialing plans for telephone calls received from her husband's associates, a parent may not know the dialing plans for telephone calls received from a child's friends, and so forth.

Therefore, a caller ID call-back device may include a memory call-back feature to associate a dialing plan indicator with each directory number stored in the directory number memory 68. Specifically, FIG. 4 is a block diagram of a caller ID call-back device 42', which is similar to the caller ID call-back device 42 except that the caller ID call-back device 42' includes a fourth button, a memory call-back selection button 76. In addition, the directory number memory 68 of the caller ID call-back device 42' includes a register or data field for storing a dialing plan indicator in association with each directory number. Upon dialing a directory number for which a dialing plan indicator is not saved, the caller ID call-back device 42' prompts a user to store the selected dialing plan indicator in association with the selected directory number, for example by displaying a message on the display device 50, beeping, playing an announcement, or flashing a light.

Specifically, as shown in FIG. 4, the directory number memory 68 may include a plurality of directory number indicators 82a–82n. Each directory number indicator 82a–82n is associated with a corresponding directory number 84a–84n. Each directory number indicator is also associated with a dialing plan. For instance, the directory number indicator 82a, which is the digit one, may correspond to a 7-digit dialing plan. The directory number indicator 82b, which is the digit two, may correspond to a 10-digit dialing plan. And the directory number indicator 82c, which is the digit three, may correspond to an 11-digit dialing plan. Because there are presently three dialing plans in use in the NANP, a two-bit register or data field is sufficient to store the dialing plan indicator. And a three-bit register or data field would allow up to eight different dialing plans, which could accommodate several dialing prefixes such as "011" for foreign calls, "115" for directory assistance calls, "9" for accessing an outside line in a PBX, as the like. Moreover, a larger register or data field would accommodate larger dialing prefixes, such as account codes or calling card codes.

A user may use the button 76 both to store a dialing plan indicator in association with a selected directory number and to automatically dial a selected directory number using a dialing plan corresponding to a previously-stored dialing plan indicator. Accordingly, a user may input a first type of memory call-back command, for example a single click of the button 76, to automatically dial a selected directory number using a dialing plan corresponding to a previously-stored dialing plan indicator. In addition, a user may input a second type of memory call-back command, for example a double click of the button 76, to automatically store a dialing plan indicator in association with a selected directory number. Other types of commands may equivalently be used to distinguish the two types of memory call-back commands, such as a long versus short hold-down duration of a button press, a button press while the telephone 46 on-hook versus off-hook, and so forth.

Figure 5:
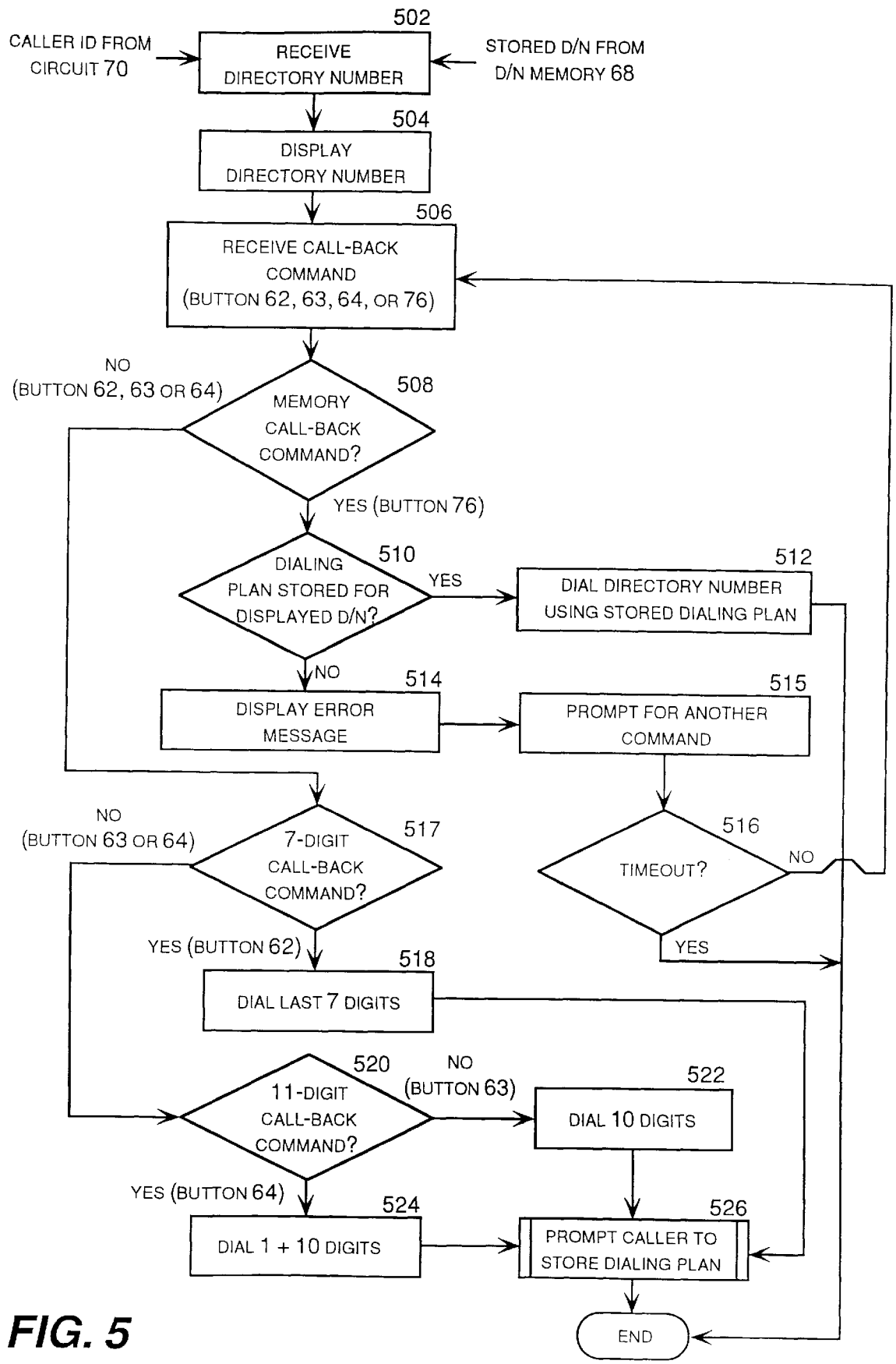
FIG. 5 is a logic flow diagram that illustrates a method for automatically placing a telephone call using the caller ID call-back device of FIG. 4.

FIG. 5 is a logic flow diagram that illustrates a method for automatically placing a telephone call using the caller ID call-back device 42' of FIG. 4. In step 502, the caller ID call-back device 42' receives a selected 10-digit directory number, either from the dialing/caller ID circuit 70 or from the directory number memory 68. In step 504, the selected 10-digit directory number is displayed in the display device 50. In step 506, the caller ID call-back device 42' receives a call-back command, either from the button 62, the button 63, the button 64, or the button 76. In decision step 508, the caller ID call-back device determines whether the call-back command is a memory call-back command from the button 76.

If the call-back command is a memory call-back command from the button 76, the "YES" branch is followed from step 508 to step 510, in which the caller ID call-back device 42' determines whether the directory number memory 68 includes the selected directory number along with an associated dialing plan indicator. If the directory number memory 68 does include the selected directory number along with an associated dialing plan indicator, the "YES" branch is followed from step 510 to step 512, in which the caller ID call-back device 42' places a telephone call to the selected directory number using the dialing plan corresponding to the dialing plan indicator associated with the selected directory number. If the directory number memory 68 does not include the selected directory number along with an associated dialing plan indicator, the "NO" branch is followed from step 510 to step 514, in which the caller ID call-back device 42' indicates an error condition, for example by displaying a message on the display device 50, beeping, playing an announcement, or flashing a light.

Step 514 is followed to step 515, in which the caller ID call-back device 42' prompts the user for another command, typically by displaying a visible prompt in the display device 50 or annunciating an audible prompt. Step 515 is followed by step 516, in which the caller ID call-back device 42' determines whether a timeout period, such as a few seconds, has expired since the error condition occurred. If the user enters another call-back command before the timeout period expires, the "NO" branch loops back to step 506, in which the caller ID call-back device 42' receives another call-back command. If the timeout period expires before the user enters another call-back command, the "YES" branch is followed to the "END" step.

Referring again to step 508, if the call-back command is not a memory call-back "command from the button 76, the "NO" branch is followed to step 517, in which the caller ID call-back device 42' determines whether the call-back command is a 7-digit call-back command from the button 62. If the call-back command is a 7-digit call-back command from the button 62, the "YES" branch is followed from step 517 to step 518, in which the caller ID call-back device 42' places a telephone call to the selected directory number by dialing the last seven digits of the selected directory number. Step 518 is followed by routine 526 in which the caller ID call-back device 42' may prompt the user to store the selected dialing plan along with a dialing plan indicator corresponding to the selected dialing plan (i.e., in this case, the 7-digit dialing plan). Routine 526 is described in detail below with reference to FIG. 6. Routine 526 is followed by the "END" step.

Referring again to step 516, if the call-back command is not a 7-digit call-back command from the button 62, the "NO" branch is followed from step 516 to step 520, in which the caller ID call-back device 42' determines whether the call-back command is a 10-digit call-back command from the button 63 or an 11-digit call-back command from the button 64. If the call-back command is a 10-digit call-back command from the button 63, the "NO" branch is followed from step 520 to step 522, in which the caller ID call-back device 42' places a telephone call to the selected directory number by dialing all ten digits of the selected directory number. Step 522 is followed by routine 526 in which the caller ID call-back device 42' may prompt the user to store the selected dialing plan along with a dialing plan indicator corresponding to the selected dialing plan (i.e., in this case, the 10-digit dialing plan). Step 522 is followed by the "END" step.

If the call-back command is an 11-digit call-back command from the button 64, the "YES" branch is followed from step 520 to step 524, in which the caller ID call-back device 42' places a telephone call to the selected directory number by dialing the digit one plus all ten digits of the selected directory number. Step 524 is followed by routine 526, in which the caller ID call-back device 42' may prompt the user to store the selected dialing plan along with a dialing plan indicator corresponding to the selected dialing plan (i.e., in this case, the 11-digit dialing plan). Step 526 is followed by the "END" step. It should be understood that the decision steps 508, 510, and 516 could be implemented by using the button 62 to latch a first line of the controller 66, by using the button 63 to latch a second line of the controller, by using the button 64 to latch a third line of the controller, and by using the button 76 to latch a fourth line of the controller.

Figure 6:
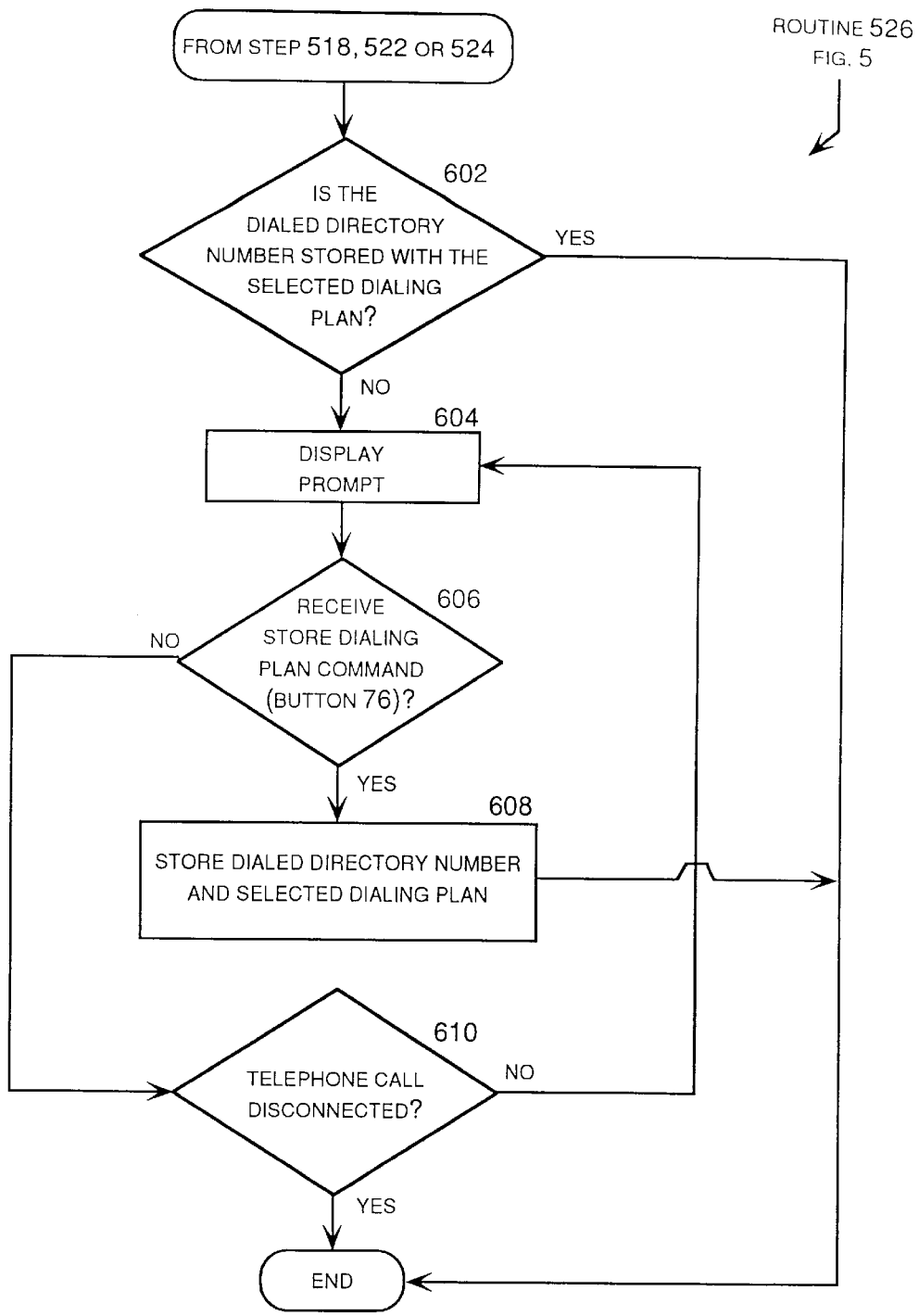
FIG. 6 is a logic flow diagram that illustrates a method for prompting a user to store a directory and an associated dialing plan indicator in the caller ID call-back device of FIG. 4.
Figure 7:
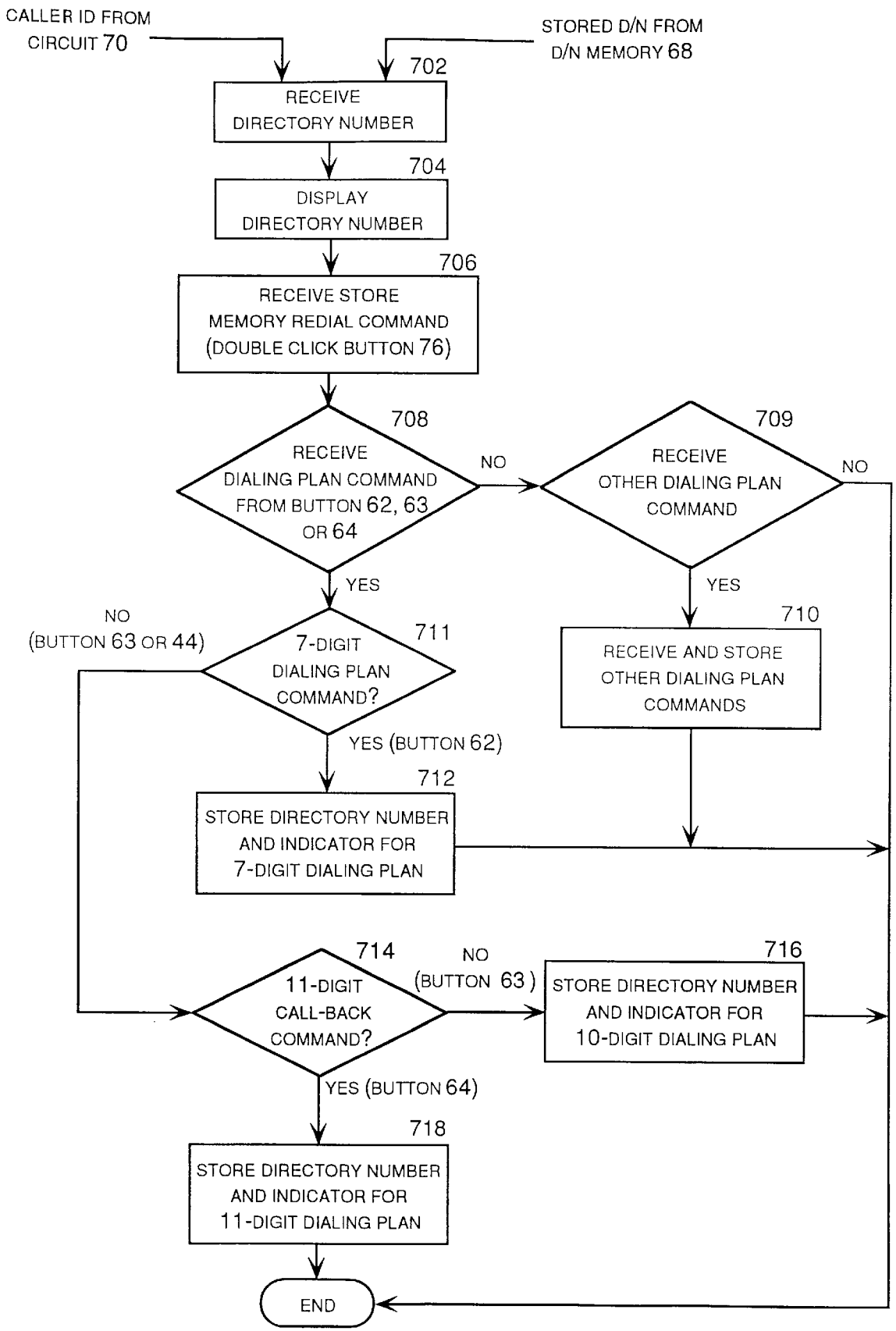
FIG. 7 is a logic flow diagram that illustrates a method for storing a directory and an associated dialing plan indicator in the caller ID call-back device of FIG. 4.

FIG. 6 is a logic flow diagram that illustrates a routine 526 for prompting a user to store a directory number and an associated dialing plan indicator in the caller ID call-back device 42' of FIG. 7. Routine 526 may follow step 518, step 522, or step 524. In step 602, the caller ID call-back device 42' determines whether the directory number memory 68 includes the selected directory number along with an associated dialing plan indicator. If the directory number memory 68 does include the selected directory number along with an associated dialing plan indicator, the "YES" branch is followed from step 602 to the "END" step. If the directory number memory 68 does not include the selected directory number along with an associated dialing plan indicator, the "NO" branch is followed from step 602 to step 604, in which the caller ID call-back device 42' prompts the user to store the selected directory number along with the selected dialing plan, for example by displaying a message on the display device 50, beeping, playing an announcement, or flashing a light.

Step 604 is followed step 606, in which the caller ID call-back device 42' may receive a store dialing plan command, preferably from the memory call-back button 76. If the caller ID call-back device 42' does receive a store dialing plan command from the memory call-back button 76, the "YES" branch is followed from step 606 to step 608, in which the caller ID call-back device 42' stores the selected directory number in association with a dialing plan indicator for the selected dialing plan in the directory number memory 68. Step 608 is followed by the "END" step.

Referring again to step 606, if the caller ID call-back device 42' does not receive a store dialing plan command from the memory call-back button 76, the "NO" branch is followed from step 606 to step 610, in which the caller ID call-back device 42' determines whether the telephone call has been disconnected. If the telephone call has not been disconnected, the "NO" branch is followed from step 610 back to step 604, in which the caller ID call-back device 42' prompts the user to store the selected directory number along with the selected dialing plan. Step 608 is followed by the "END" step. If the telephone call has been disconnected, the "YES" branch is followed from step 610 the "END" step.

Thus, the caller ID call-back device 42' continues to prompt the user to store the selected directory number along with the selected dialing plan until the user enters a store command using the button 76 or until the telephone call is disconnected. It should be understood that a caller ID call-back device 42' may equivalently discontinue the prompt after a timeout period rather than prompting the user for the entire duration of the telephone call. In addition, the caller ID call-back device 42' may prompt the user after disconnection of the telephone call and provide the user with a timeout period during which the user may enter a store command using the button 76.

According to the method illustrated by FIG. 6, the caller ID call-back device 42' allows a user to store a selected directory number along with a selected dialing plan after the caller ID call-back device 42' has placed a telephone call to the selected directory number. But a user may also want to store a selected directory number along with a selected dialing plan without having to first place a telephone call to the selected directory number. For example, the caller ID call-back device 42' may receive a caller ID directory number that the user wants to store along with a dialing plan indicator. In addition, the caller ID call-back device 42' may be programmed in advance with directory numbers. In this case, the user may want to include dialing plans with these programmed directory numbers.

FIG. 7 is a logic flow diagram that illustrates a method for storing a directory number and an associated dialing plan indicator in the caller ID call-back device 42' of FIG. 4. In step 702, the caller ID call-back device 42' receives a selected 10-digit directory number, either from the dialing/caller ID circuit 70 or from the directory number memory 68. In step 704, the selected 10-digit directory number is displayed in the display device 50. In step 706, the caller ID call-back device 42' receives a store memory call-back command, such as a double click of the memory call-back button 76.

In decision step 708, the caller ID call-back device 42' receives a command and determines whether this command is a dialing plan command from one of the buttons 62, 63, or 64. If the command is not a dialing plan command from one of the buttons 62, 63, or 64, the "NO" branch is followed to step 709, in which the caller ID call-back device 42' determines whether the command is another recognizable dialing plan command, such as a command for storing an account code, calling card code, or other type of dialing plan in association with the displayed directory number. If the command is another recognizable dialing plan command, the "YES" branch is followed to step 710, in which the caller ID call-back device 42' receives and stores the associated dialing plan commands. Step 710 and the "NO" branch from step 709 are followed by the "END" step.

Referring again to step 708, if the received command is a dialing plan command from one of the buttons 62, 63, or 64, the "YES" branch is followed to step 711, in which the caller ID call-back device 42' determines whether the dialing plan command is a 7-digit dialing plan command from the button 62. If the dialing plan command is a 7-digit dialing plan command from the button 62, the "YES" branch is followed to step 712, in which the caller ID call-back device 42' stores the selected directory number in association with a dialing plan indicator for the selected dialing plan (i.e., in this case, the 7-digit dialing plan) in the directory number memory 68. Step 712 is followed by the "END" step.

Referring again to step 711, if the dialing plan command is not a 7-digit dialing plan command from the button 62, the "NO" branch is followed to step 714, in which the caller ID call-back device 42' determines whether the dialing plan command is a 10-digit dialing plan command from the button 63 or an 11-digit dialing plan command from the button 64. If the dialing plan command is a 10-digit dialing plan command from the button 63, the "NO" branch is followed from step 714 to step 716, in which the caller ID call-back device 42' stores the selected directory number in association with a dialing plan indicator for the selected dialing plan (i.e., in this case, the 10-digit dialing plan) in the directory number memory 68. Step 716 is followed by the "END" step.

If the dialing plan command is an 11-digit dialing plan command from the button 64, the "YES" branch is followed from step 714 to step 718, in which the caller ID call-back device 42' stores the selected directory number in association with a dialing plan indicator for the selected dialing plan (i.e., in this case, the 11-digit dialing plan) in the directory number memory 68. Step 718 is followed by the "END" step. Thus, the user may store a dialing plan indicator for any of the dialing plans in association with any selected directory number.

It should also be appreciated that a caller ID call-back device according to the present invention could include alternate or additional dialing plan selection devices for automatically dialing other dialing plans, such as dialing 37 011" before a selected directory number for an international telephone call, or dialing "115" before a selected directory number for an operator assisted telephone call, or dialing "9" before a dialing plan to connect to an outside line within a PBX, or dialing a prefix code such as an account code or calling card code, and so forth. In addition, a caller ID call-back device preferably allows a user to manually input any sequence of digits before selecting a dialing plan for a selected directory number. This allows a user to manually input a code, such as "011," "015," "9," an account code, or calling card code before dialing a selected directory number.

In view of the foregoing, it will be appreciated that the present invention provides a caller ID call-back device that allows a user to automatically place telephone calls to stored directory numbers using three different dialing plans. For example, a user may select among first, second, and third buttons to place the telephone call by automatically dialing a selected directory number using a first, second, or third dialing plan. The caller ID call-back device may also include a memory call-back selection device for automatically dialing the selected directory number in accordance with a dialing plan indicator that was previously saved in association with the selected directory number. In addition, after the user selects a dialing plan to automatically place a telephone call to a selected directory number, the caller ID call-back device may prompt the user the save the selected dialing plan in association with the selected directory number. It should be understood that the foregoing relates only to specific embodiments of the present invention, and that numerous changes may be made therein without departing from the spirit and scope of the invention as defined by the following claims.

What is claimed is:

1. An apparatus for automatically placing a telephone call to a received caller ID directory number using a selected dialing plan, comprising:
    a controller;
    a caller ID circuit for detecting originating directory number associated with a received telephone call, the originating directory number comprising an area code and a terminating destination code;
    a display device coupled to the controller for displaying the received directory number;
    a directory number memory coupled to the controller for storing a plurality of received caller directory numbers, each directory number comprising an area code and a terminating destination code;
    first, second, and third, an fourth dialing plan selection devices for receiving user input;
    a dialing circuit coupled to the controller for automatically placing a telephone call to the received directory number using a first dialing plan, a second dialing plan, or a third dialing plan; and
    the controller configured for:
        receiving user input from the first dialing plan selection device, and in response to receiving the user input from the first dialing plan selection device, causing the dialing circuit to place a telephone call to the received directory number using the first dialing plan,
        receiving user input from the second dialing plan selection device, and in response to receiving the user input from the second dialing plan selection device, causing the dialing circuit to place a telephone call to the received directory number using the second dialing plan,
        receiving user input from the third dialing plan selection device, and in response to receiving the user input from the third dialing plan selection device, causing the dialing circuit to place a telephone call to the received directory number using the third dialing plan, and
        receiving user input from the fourth dialing plan selection device, and in response to receiving the user input from the fourth dialing plan selection device:
            searching in the directory number memory for a record corresponding to the originating directory number,
            reading a dialing plan indicator stored in association with the record, the dialing plan indicator identifying a selected one of the first, second, or third dialing plans, and
            causing the dialing circuit to place a telephone call to the originating directory number using the selected dialing plan.

2. The apparatus of claim 1, further comprising:
a directory number memory coupled to the controller for storing a plurality of received caller ID directory numbers, each directory number comprising an area code and a terminating destination code.

3. The apparatus of claim 2, further comprising:
a directory number selection device for changing the received directory number displayed in the display device to another of the directory numbers stored in the directory number memory.

4. The apparatus of claim 1, wherein:
the first dialing plan consists essentially of the terminating destination code of the originating directory number;
the second dialing plan consists essentially of the area code and the terminating destination code of the originating directory number; and
the third dialing plan consists essentially of a predefined digit or sequence of digits plus the area code and the terminating destination code of the originating directory number.

5. The apparatus of claim 4, wherein:
the first, second, or third dialing plans may be preceded by one or more user input digits.

6. The apparatus of claim 4, wherein:
the first, second, or third dialing plans may be preceded by one or more automatically dialed digits.

7. The apparatus of claim 6, wherein the predefined digit or sequence of digits is a member selected from the group consisting of:
one;
zero;
zero, one, one;
one, one, five;

an account code; and a calling card code.

8. An apparatus for automatically placing a telephone call to a received caller ID directory number using a selected dialing plan, comprising:

a controller;

a caller ID circuit for detecting an originating directory number associated with a received telephone call, the originating directory number comprising an area code and a terminating destination code;

a display device coupled to the controller for displaying the received directory number;

a directory number memory coupled to the controller for storing a plurality of received caller ID directory numbers, each directory number comprising an area code and a terminating destination code;

first, second, and third, and fourth dialing plan selection devices for receiving user input;

a dialing circuit coupled to the controller for automatically placing a telephone call to the received directory number using a first dialing plan, a second dialing plan, or a third dialing plan; and the controller configured for:

receiving user input from the first dialing plan selection device, and in response to receiving the user input from the first dialing plan selection device, causing the dialing circuit to place a telephone call to the received directory number using the first dialing plan, receiving user input from the second dialing plan selection device, and in response to receiving the user input from the second dialing plan selection device, causing the dialing circuit to place a telephone call to the received directory number using the second dialing plan, receiving user input from the third dialing plan selection device, and in response to receiving the user input from the third dialing plan selection device, causing the dialing circuit to place a telephone call to the received directory number using the third dialing plan, receiving user input from the fourth dialing plan selection device, and in response to receiving the user input from the fourth dialing plan selection device:

prompting the user to enter a dialing plan selection using the first, second, or third dialing plan selection devices, receiving a user input from a selected one of the first, second, or third dialing plan selection device, and storing the originating directory number in the directory number memory along with a dialing plan indicator associated with the selected dialing plan.

9. The apparatus of claim 8, further comprising:

a directory number selection device for changing the received directory number displayed in the display device to another one of the directory numbers stored in the directory number memory.

10. The apparatus of claim 9, wherein;

the first dialing plan consists essentially of the terminating destination code of the originating directory number;

the second dialing plan consists essentially of the area code and the terminating destination code of the originating directory number; and the third dialing plan consists essentially of a predefined digit or sequence of digits plus the area code and the terminating destination code of the originating directory number.

11. The apparatus of claim 10, wherein, the first, second, or third dialing plans may be preceded by one or more user input digits.

12. The apparatus of claim 11, wherein:

the first, second, or third dialing plans may be preceded by one or more automatically dialed digits.

13. The apparatus of claim 12, wherein the predefined digit or sequence of digits is a member selected from the group consisting of:

one;

zero;

zero, one, one;

one, one, five;

an account code; and a calling card code.

* * * * *